United States Patent
Desimone et al.

(10) Patent No.: US 9,883,193 B2
(45) Date of Patent: *Jan. 30, 2018

(54) CODING SCHEME FOR IDENTIFYING SPATIAL LOCATIONS OF EVENTS WITHIN VIDEO IMAGE DATA

(71) Applicant: International Business Machines Corporation, Armonk, NY (US)

(72) Inventors: Michael J. Desimone, Ridgefield, CT (US); Arun Hampapur, Norwalk, CT (US); Zuoxuan Lu, Yorktown Heights, NY (US); Carl P. Mercier, New Milford, CT (US); Christopher S. Milite, Oxford, CT (US); Stephen R. Russo, Southbury, CT (US); Chiao-Fe Shu, Scarsdale, NY (US); Chek K. Tan, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,161

(22) Filed: May 3, 2016

(65) Prior Publication Data

US 2016/0249063 A1  Aug. 25, 2016

Related U.S. Application Data

(63) Continuation of application No. 14/041,304, filed on Sep. 30, 2013, now Pat. No. 9,380,271, which is a
(Continued)

(51) Int. Cl.
*H04N 19/25* (2014.01)
*G06K 9/00* (2006.01)
(Continued)

(52) U.S. Cl.
CPC ......... *H04N 19/25* (2014.11); *G06K 9/00335* (2013.01); *G06K 9/00771* (2013.01);
(Continued)

(58) Field of Classification Search
CPC .................................................. G06K 9/00335
(Continued)

(56) References Cited

U.S. PATENT DOCUMENTS 6,091,777 A * 7/2000 Guetz ................. H04N 19/172
375/240.03
6,198,850 B1 3/2001 Banton
(Continued)

OTHER PUBLICATIONS

IEEE search NPL log.*
(Continued)

*Primary Examiner* — Luis Perez Fuentes
(74) *Attorney, Agent, or Firm* — Maeve M. Carpenter; Hunter E. Webb; Keohane & D'Alessandro, PLLC

(57) ABSTRACT

An approach for generating a coding schema for identifying a spatial location of an event within video image data is provided. In one embodiment, there is a spatial representation tool, including a compression component configured to receive trajectory data of a trajectory of an object for an event within video image data; generate a lossless compressed contour-coded blob to encode the trajectory data of the trajectory of the object for the event within video image data; generate a lossy searchable code of the trajectory of the object for the event within the video image data; convert a region of interest within the video image data to a lossy query code, the region of interest corresponding to a subsection of a visual display output of the video image data; and compare the lossy query code to the lossy searchable code within a relational database to identify a corresponding
(Continued)

lossless trajectory data of the trajectory of the object for the event within the video image data.

18 Claims, 7 Drawing Sheets

Related U.S. Application Data continuation of application No. 12/407,520, filed on Mar. 19, 2009, now Pat. No. 8,553,778.

(51) Int. Cl.
| | |
|---|---|
| G06K 9/48 | (2006.01) |
| H04N 7/18 | (2006.01) |
| H04N 19/167 | (2014.01) |
| H04N 19/182 | (2014.01) |

(52) U.S. Cl.
CPC ............... *G06K 9/481* (2013.01); *H04N 7/18* (2013.01); *H04N 19/167* (2014.11); *H04N 19/182* (2014.11)

(58) Field of Classification Search
USPC .................................................. 375/240.16
See application file for complete search history.

(56) References Cited

U.S. PATENT DOCUMENTS

| | | | |
|---|---|---|---|
| 6,263,088 | B1 | 7/2001 | Crabtree et al. |
| 6,418,424 | B1 | 7/2002 | Hoffberg et al. |
| 6,587,574 | B1 | 7/2003 | Jeannin |
| 6,711,278 | B1 | 3/2004 | Gu et al. |
| 6,757,008 | B1 | 6/2004 | Smith |
| 6,879,266 | B1 | 4/2005 | Dye et al. |
| 7,030,905 | B2 | 4/2006 | Carlbom et al. |
| 7,062,088 | B1* | 6/2006 | Clauson ............... H04N 19/147 345/563 |
| 7,072,398 | B2 | 7/2006 | Ma |
| 7,088,846 | B2 | 8/2006 | Han et al. |
| 7,143,083 | B2 | 11/2006 | Carlbom et al. |
| 7,165,112 | B2 | 1/2007 | Battin et al. |
| 7,190,284 | B1 | 3/2007 | Dye et al. |
| 7,263,472 | B2 | 8/2007 | Porikli |
| 7,444,003 | B2 | 10/2008 | Laumeyer et al. |
| 7,542,588 | B2 | 6/2009 | Ekin et al. |
| 7,598,977 | B2 | 10/2009 | Ryall et al. |
| 7,760,908 | B2 | 7/2010 | Curtner et al. |
| 7,761,456 | B1 | 7/2010 | Cram et al. |
| 7,801,328 | B2 | 9/2010 | Au et al. |
| 7,868,912 | B2 | 1/2011 | Venetianer et al. |
| 7,961,946 | B2 | 6/2011 | Hammadou |
| 8,131,012 | B2 | 3/2012 | Eaton et al. |
| 8,416,847 | B2 | 4/2013 | Roman |
| 8,537,219 | B2* | 9/2013 | Desimone ............ G06K 9/00335 348/143 |
| 8,553,778 | B2* | 10/2013 | Desimone ............ G06K 9/00335 348/143 |
| 8,687,702 | B2 | 4/2014 | Schmit |
| 8,971,580 | B2 | 3/2015 | Desimone et al. |
| 9,189,688 | B2 | 11/2015 | Desimone et al. |
| 9,380,271 | B2* | 6/2016 | Desimone ............ G06K 9/00335 |
| 9,503,693 | B2 | 11/2016 | Desimone et al. |
| 2002/0105529 | A1 | 8/2002 | Bowser et al. |
| 2003/0023595 | A1 | 1/2003 | Carlbom et al. |
| 2003/0025599 | A1 | 2/2003 | Monroe |
| 2003/0063670 | A1 | 4/2003 | Masukura et al. |
| 2003/0081685 | A1* | 5/2003 | Montgomery ....... H04N 19/503 375/240.24 |
| 2004/0194129 | A1 | 9/2004 | Carlbom et al. |
| 2006/0036695 | A1 | 2/2006 | Rolnik |
| 2006/0056518 | A1 | 3/2006 | Conklin |
| 2006/0062478 | A1 | 3/2006 | Cetin et al. |
| 2006/0187305 | A1 | 8/2006 | Trivedi et al. |
| 2006/0279630 | A1 | 12/2006 | Aggarwal et al. |
| 2007/0190990 | A1 | 8/2007 | Yin |
| 2007/0257986 | A1 | 11/2007 | Ivanov et al. |
| 2007/0260080 | A1 | 11/2007 | Hara et al. |
| 2007/0260809 | A1 | 11/2007 | Hara et al. |
| 2008/0037880 | A1 | 2/2008 | Lai |
| 2008/0120558 | A1 | 5/2008 | Nathan et al. |
| 2008/0129844 | A1 | 6/2008 | Cusack et al. |
| 2008/0195713 | A1 | 8/2008 | Benschop et al. |
| 2008/0252723 | A1 | 10/2008 | Park |
| 2009/0055484 | A1 | 2/2009 | Vuong et al. |
| 2009/0210505 | A1 | 8/2009 | Thomas et al. |
| 2010/0238285 | A1 | 9/2010 | Desimone et al. |
| 2010/0239016 | A1 | 9/2010 | Desimone et al. |
| 2010/0332468 | A1 | 12/2010 | Cantrell |
| 2011/0041181 | A1 | 2/2011 | Niccolini et al. |
| 2011/0096149 | A1 | 4/2011 | Au et al. |
| 2012/0207387 | A1 | 8/2012 | Pereira et al. |
| 2013/0259316 | A1 | 10/2013 | Desimone et al. |
| 2014/0028845 | A1 | 1/2014 | Desimone et al. |
| 2015/0161453 | A1 | 6/2015 | Desimone et al. |
| 2016/0014378 | A1 | 1/2016 | Desimone et al. |

OTHER PUBLICATIONS

SPIE search NPL log.*
Lu, Tom Y., U.S. Appl. No. 14/864,007, Notice of Allowance dated Jul. 27, 2016, 7 pages.
Dimitrova, Nevenka and Golshani, Forouzan, "Motion Recovery for Video Content Classification", ACM Transaction on Information Systems, vol. 13, No. 4, Oct. 1995, pp. 408-439.
Tian, Ying-li et al, "Event Detection, Query, and Retrieval for Video Surveillance", Artificial Intelligence for Maximizing Content Based Image Retrieval, Chapter XV, pp. 342-370, Publication Date Nov. 26, 2008.
Luciano da Fontoura Costa and Roberto Marcondes Cesar Jr., "Shape Analysis and Classification", CRC Press, 2001.
Maytham H. Safar and Cyrus Shahabi, "Shape Analysis and Retrieval of Multimedia Objects", Kluwer Academic Publishers, 2003.
Partial International Search Report, PCT/EP2010/052636, dated Sep. 14, 2010.
International Search Report, PCT/EP20101052636, dated Dec. 29, 2010.
Ziliani, F. et al., "Effective integration of object tracking in a video coding scheme for multisensor surveillance systems," Proceedings of the 2002 International Conference on Image Processing, Rochester, New York, Sep. 22-25, pp. 521-524.
Perez Fuentes, Luis M., USPTO Office Action, U.S. Appl. No. 12/407,520, dated Aug. 4, 2011, 17 pages.
Perez Fuentes, Luis M., USPTO Final Office Action, U.S. Appl. No. 12/407,520, dated Oct. 25, 2011, 19 pages.
Perez Fuentes, Luis M., USPTO Office Action, U.S. Appl. No. 12/407,520, dated Sep. 13, 2012, 14 pages.
Perez Fuentes, Luis M., USPTO Notice of Allowance and Fee(s) Due, U.S. Appl. No. 12/407,520, dated May 29, 2013, 43 pages.
Gupta, Muktesh G., USPTO Office Action, U.S. Appl. No. 12/407,499, dated Oct. 26, 2011, 17 pages.
Gupta, Muktesh G., USPTO Final Office Action, U.S. Appl. No. 12/407,499, dated Sep. 19, 2012, 13 pages.
Bayard, Djenane M., USPTO Notice of Allowance and Fee(s) Due, U.S. Appl. No. 12/407,499, dated Jan. 18, 2013, 13 pages.
Perez Fuentes, Luis M., USPTO Office Action, U.S. Appl. No. 14/041,304, dated Jan. 30, 2015, 20 pages.
Carlton Johnson, USPTO Office Action, U.S. Appl. No. 14/161,841, dated Apr. 27, 2015, 29 pages.
Perez Fuentes, Luis M., USPTO Office Action, U.S. Appl. No. 14/041,304, dated Jun. 29, 2015, 17 pages.
Lu, U.S. Appl. No. 13/903,237, Notice of Allowance dated Oct. 27, 2014, 15 pages.
Lu, U.S. Appl. No. 14/595,726, Office Action dated Mar. 24, 2015, 14 pages.
Lu, U.S. Appl. No. 14/595,726, Notice of Allowance dated Jul. 8, 2015, 12 pages.

(56) References Cited

OTHER PUBLICATIONS

Perez, U.S. Appl. No. 12/407,520, Notice of Allowance dated Aug. 15, 2013, 10 pages.
Lu, Tom Y., U.S. Appl. No. 14/864,007, Office Action dated Apr. 8, 2016, 29 pages.
Perez Fuentes, Luis M., USPTO Notice of Allowance, U.S. Appl. No. 14/041,304, dated Mar. 29, 2016, 23 pages.
Lu, Tom, U.S. Appl. No. 15/242,699, Office Action, dated Jan. 5, 2017, 17 pgs.
Lu, Tom, U.S. Appl. No. 15/242,699, Notice of Allowance, dated Apr. 5, 2017, 12 pgs.

* cited by examiner

CODING SCHEME FOR IDENTIFYING SPATIAL LOCATIONS OF EVENTS WITHIN VIDEO IMAGE DATA

CROSS-REFERENCE TO RELATED APPLICATION

This application is a continuation of, and claims the benefit of, co-pending and co-owned U.S. patent application Ser. No. 14/041,304, filed Sep. 30, 2013, the entire contents of which are incorporated herein by reference. This application is a continuation of, and claims the benefit of, co-pending and co-owned U.S. patent application Ser. No. 14/041,304 is a continuation of commonly owned U.S. patent application Ser. No. 12/407,520, filed Mar. 19, 2009, U.S. Pat. No. 8,553,778, issued Oct. 8, 2013, the entire contents of which are herein incorporated by reference. This application is also related in some aspects to the commonly owned U.S. application Ser. No. 14/864,007, filed Sep. 24, 2015, which is a continuation of commonly owned and issued U.S. Pat. No. 9,189,688, Issued Nov. 17, 2015, which is a continuation of commonly owned and issued U.S. Pat. No. 8,537,219, issued Sep. 17, 2013.

FIELD OF THE INVENTION

The present invention generally relates to video surveillance, and more specifically to coding for spatial surveillance event searching.

BACKGROUND OF THE INVENTION

Large surveillance networks that are deployed on buildings, highways, trains, metro stations, etc., integrate a large number of cameras, sensors, and information. Human operators typically cannot adequately control and monitor all the cameras within a large surveillance system. As such, many prior art approaches involve object detection and tracking techniques to identify and analyze events occurring within a camera field of view. However, when it comes to searching through large amounts of video data in an effort to identify an event within video image data, it is difficult to obtain reliable results.

For example, consider a surveillance camera that is monitoring a long-term parking lot. The parking lot attendant receives a complaint that a car has been vandalized at some point in the past month. The prior art requires either a manual review of tapes/files from the video camera for the entire month, or the use of a query box drawn around the particular parking spot with the surveillance system retrieving all movement that occurred in the query box. The first approach is typically ineffective because an operator or group of operators must review hundreds of hours of video to observe an event that may have lasted a few seconds. The second approach uses automatic video object tracking and meta-data indexing using a standard relational database to support spatial queries. However, the drawback of this approach is that the representation of the meta-data is very voluminous and makes the indexing of large numbers of cameras impractical due to the heavy volume of network traffic and the size of database tables created.

SUMMARY OF THE INVENTION

Approaches for generating a coding schema for identifying a spatial location of an event within video image data are provided. In one embodiment, there is a spatial representation tool, including a compression component configured to receive trajectory data of a trajectory of an object for an event within video image data; generate a lossless compressed contour-coded blob to encode the trajectory data of the trajectory of the object for the event within video image data; generate a lossy searchable code of the trajectory of the object for the event within the video image data; convert a region of interest within the video image data to a lossy query code, the region of interest corresponding to a sub-section of a visual display output of the video image data; and compare the lossy query code to the lossy searchable code within a relational database to identify a corresponding lossless trajectory data of the trajectory of the object for the event within the video image data.

In one embodiment, there is a method for providing a coding scheme for identifying a spatial location of an event within video image data. In this embodiment, the method comprises: receiving trajectory data of a trajectory of an object for an event within video image data; generating a lossless compressed contour-coded blob to encode the trajectory data of the trajectory of an object for the event within the video image data; generating a lossy searchable code of the trajectory data of the trajectory of the object for the event within the region of interest; converting a region of interest within the video image data to a lossy query code, the region of interest corresponding to a sub-section of a visual display output of the video image data; and comparing the lossy query code to the lossy searchable code within a relational database to identify a corresponding lossless trajectory data of the trajectory of the object for the event within the video mage data.

In a second embodiment, there is a system for providing a coding scheme for identifying a spatial location of an event within video image data. In this embodiment, the system comprises at least one processing unit, and memory operably associated with the at least one processing unit. A spatial representation tool is storable in memory and executable by the at least one processing unit. The spatial representation tool comprises: a compression component configured to receive trajectory data of a trajectory of an object for an event within video image data; generate a lossless compressed contour-coded blob to encode the trajectory data of the trajectory of an object for the event within the video image data; generate a lossy searchable code of the trajectory data of the trajectory of the object for the event within the region of interest; convert a region of interest within the video image data to a lossy query code, the region of interest corresponding to a sub-section of a visual display output of the video image data; and compare the lossy query code to the lossy searchable code within a relational database to identify a corresponding lossless trajectory data of the trajectory of the object for the event within the video mage data.

In a third embodiment, there is a computer-readable storage device storing computer instructions, which when executed, enables a computer system to provide a coding scheme for identifying a spatial location of an event within video image data, the computer instructions comprising: receiving trajectory data of a trajectory of an object for an event within video image data; generating a lossless compressed contour-coded blob to encode the trajectory data of the trajectory of an object for the event within the video image data; generating a lossy searchable code of the trajectory data of the trajectory of the object for the event within the region of interest; converting a region of interest within the video image data to a lossy query code, the region of interest corresponding to a sub-section of a visual display output of the video image data; and comparing the lossy query code to the lossy searchable code within a relational database to identify a corresponding lossless trajectory data of the trajectory of the object for the event within the video mage data.

In a fourth embodiment, there is a method for deploying a spatial representation tool for use in a computer system that provides a coding scheme for identifying a spatial location of an event within video image data. In this embodiment, a computer infrastructure is provided and is operable to: receive trajectory data of a trajectory of an object for an event within video image data; generate a lossless compressed contour-coded blob to encode the trajectory data of the trajectory of an object for the event within the video image data; generate a lossy searchable code of the trajectory data of the trajectory of the object for the event within the region of interest; convert a region of interest within the video image data to a lossy query code, the region of interest corresponding to a sub-section of a visual display output of the video image data; and compare the lossy query code to the lossy searchable code within a relational database to identify a corresponding lossless trajectory data of the trajectory of the object for the event within the video mage data.

Figure 1:
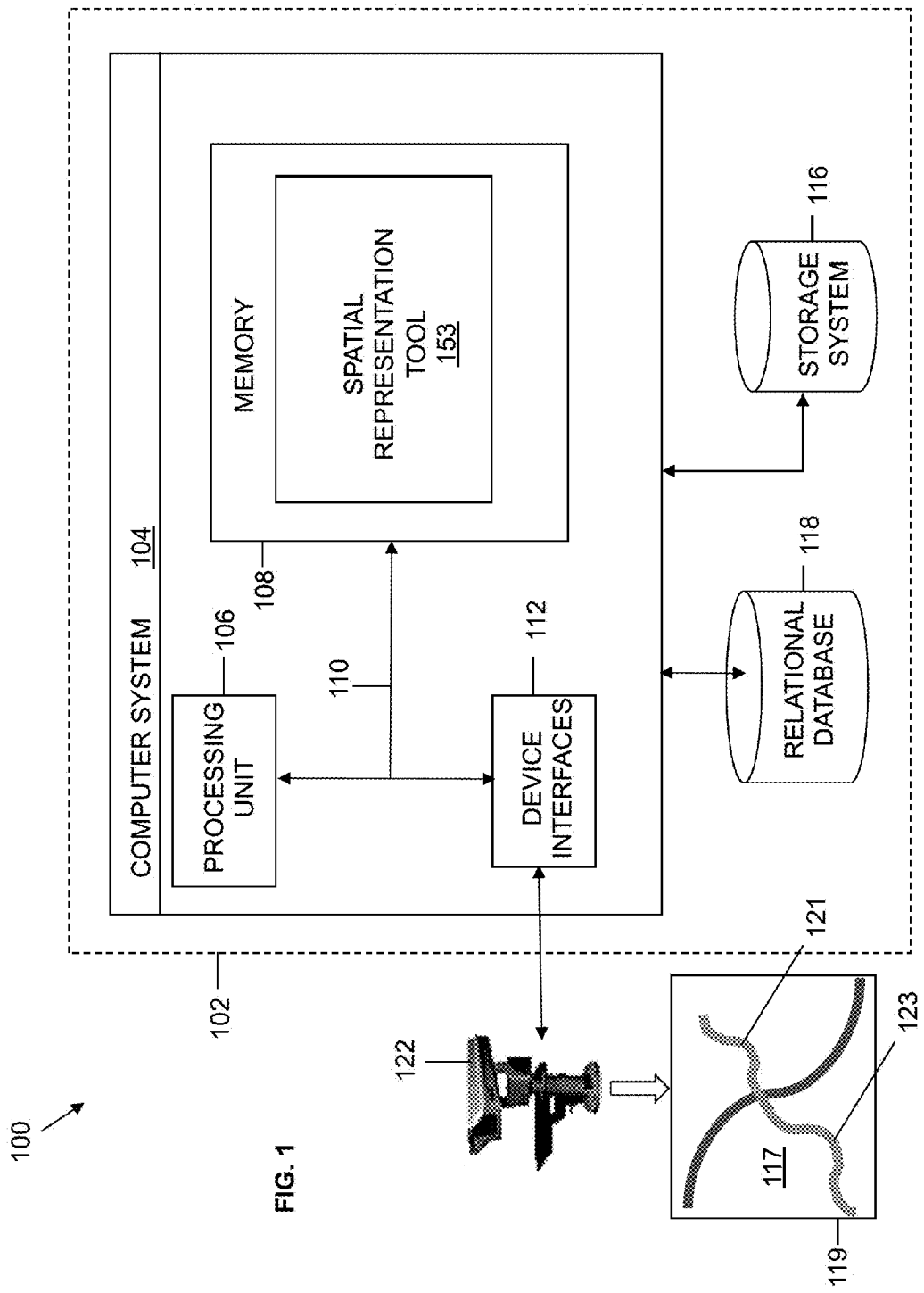
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

Embodiments of this invention are directed to a coding scheme that enables searching large numbers of surveillance camera events using relational database tables based on the location of an event within a camera field of view. In these embodiments, a spatial representation tool provides this capability. Specifically, the spatial representation tool comprises a compression component configured to receive trajectory data of an event within video image data; generate a lossless compressed contour-coded blob to encode the trajectory data of the event within video image data; and generate a lossy searchable code to enable searching of a relational database based on the trajectory data of the event within the video image data.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for generating a coding scheme for identifying a spatial location of an event in video image data. It should be understood that any other computers implemented under the present invention may have different components/software, but will perform similar functions. As shown, computer system 104 includes a processing unit 106 capable of analyzing sensor data, and producing a usable output, e.g., compressed video and video meta-data. Also shown is memory 108 for storing a spatial representation tool 153, a bus 110, and device interfaces 112.

Computer system 104 is shown communicating with a sensor device 122 that communicates with bus 110 via device interfaces 112. Sensor device 122 (or multiple sensor devices) includes sensor devices for capturing image data representing objects and visual attributes of moving objects (e.g., people, cars, animals, products, etc.) within a camera view 119 from sensor device 122, including trajectory data 121 and 123 (i.e., paths of events/objects within video image data 119). Sensor device 122 can include virtually any type of sensor capable of capturing visual attributes of objects, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 collects and routes signals representing outputs from sensor devices 122 to spatial representation tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, sensor device 122 is capable of two-way communication, and thus can receive signals (to power up, to sound an alert, etc.) from spatial representation tool 153.

In general, processing unit 106 executes computer program code, such as program code for operating spatial representation tool 153, which is stored in memory 108 and/or storage system 116. While executing computer program code, processing unit 106 can read and/or write data to/from memory 108 and storage system 116 and a relational database 118. Relational database 118 stores sensor data, including video metadata generated by processing unit 106, as well as rules against which the metadata is compared to identify objects and trajectories of objects present within video image data 119. As will be further described herein, relational database 118 stores trajectory data 117 as both a lossy searchable code and lossless compressed contour-coded blob, as well as information for efficient querying. It will be appreciated that storage system 116 and relational database 118 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Figure 2:
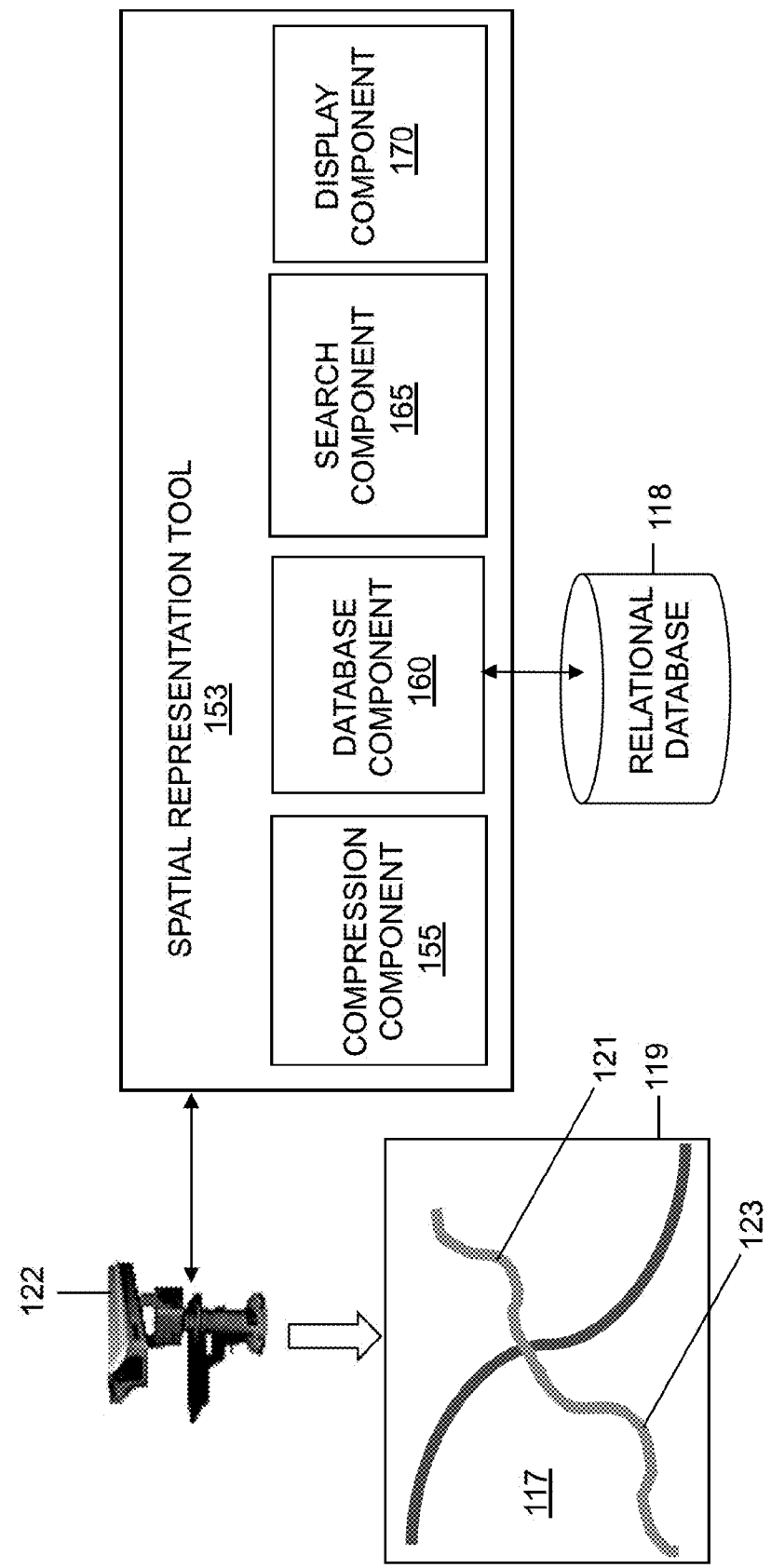
FIG. 2 shows a spatial representation tool that operates in the environment shown in FIG. 1.

FIG. 2 shows a more detailed view of spatial representation tool 153 according to embodiments of the invention. As shown, spatial representation tool 153 comprises a compression component 155 configured to receive trajectory data 117 of an event within video image data 119 (e.g., object and track data from sensor device 122). Compression component 155 processes trajectory data 117 from sensor device 122 in real-time, identifying objects and trajectories of objects that are detected in video image data 119. Compression component 155 provides the software framework for hosting a wide range of video analytics to accomplish this. The video analytics are intended to detect and track objects moving across a field of view and perform an analysis of tracking data associated with each object. The set of moving objects can be detected using a number of approaches, including but not limited to: background modeling, object detection and tracking, spatial intensity field gradient analysis, diamond search block-based (DSBB) gradient descent motion estimation, or any other method for detecting and identifying objects captured by a sensor device.

Figure 3:
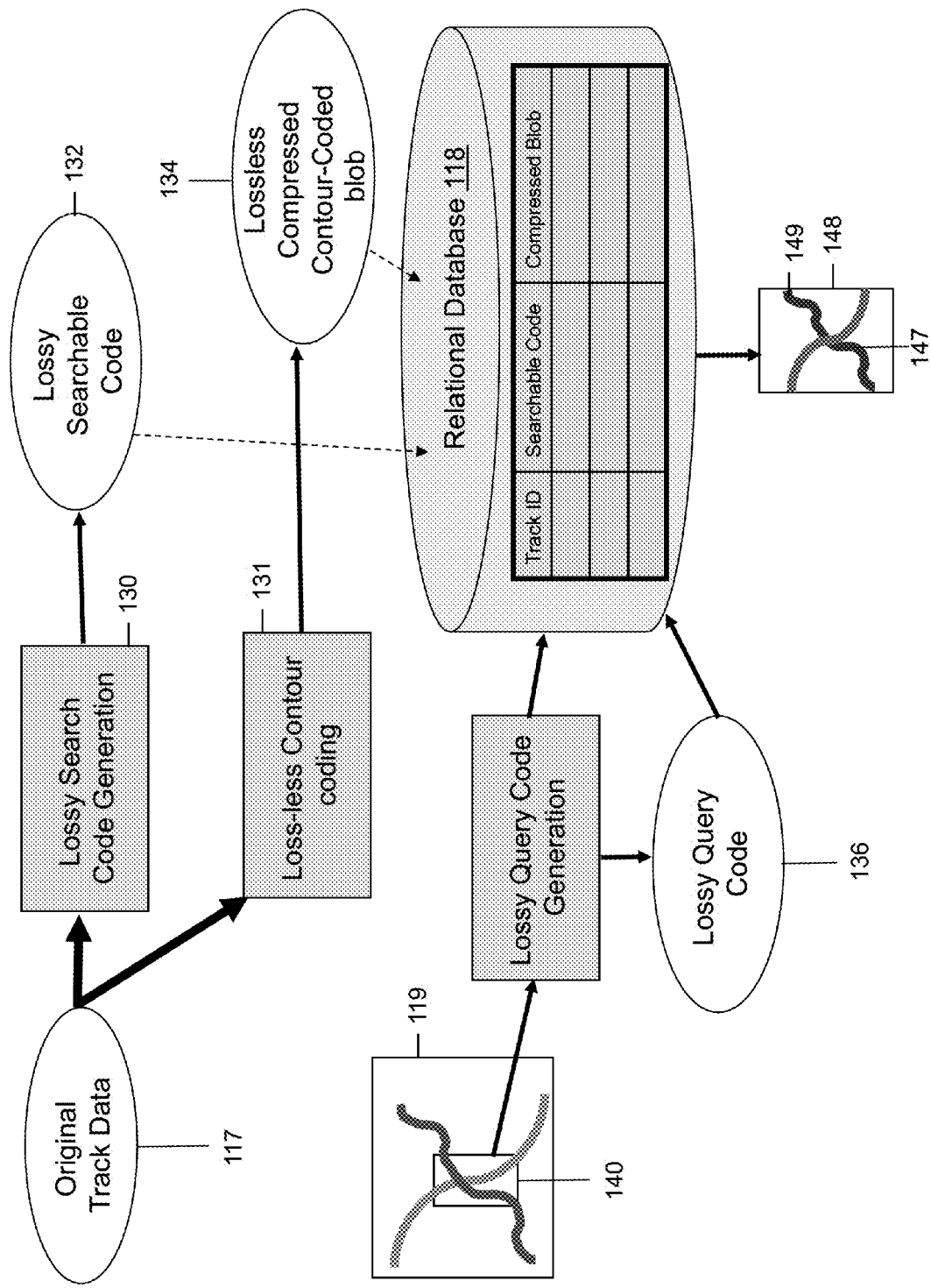
FIG. 3 shows a system for searching within video image data according to embodiments of the invention.

As shown in FIGS. 2-3, compression component 155 is configured to receive trajectory data 117 of video image data 119 and generate a lossless compressed contour-coded blob 134 to encode trajectory data 117 of the event within video image data 119. Compression component 155 is also configured to generate a lossy searchable code 134 to enable searching of relational database 118 based on the trajectory data 117 of the event within the video image data 119.

Next, both lossy searchable code 132 and lossless compressed contour-coded blob 134 are stored within relational database 118, along with the corresponding track ID, for subsequent retrieval. As shown in FIG. 2-3, spatial representational tool 153 comprises a database component 160 configured to input lossless compressed contour-coded blob 134, lossy searchable code 132, and a corresponding trajectory identifier (e.g., track ID) into relational database 118. In one embodiment, database component 160 generates and uploads messages in extensible mark-up language (XML) to relational database 118 including Track ID, search code represented as a CHAR String, and contour code packaged as a proprietary file with binary representation.

During operation, retrieval may occur when a user that is monitoring video image data 119 wishes to investigate an event (e.g., a person, a security breach, a criminal act, suspicious activity, etc.). As shown in FIGS. 2-3, spatial representation tool 153 comprises a search component 165 configured to search relational database 118 to identify a spatial location of the event within video image data 119. Specifically, search component 165 is configured to specify a region of interest 140 (FIG. 3) within video image data 119. This selection may be performed by the user monitoring video image data 119, e.g., via a pointing device (not shown). Search component 165 then converts region of interest 140 to a lossy query code 136 and performs a database search of relational database 118. Specifically, search component 165 compares lossy query code 136 to lossy searchable code 132 of trajectory data 117 of the event within video image data 119. In one embodiment, each row of relational database 118 is evaluated using a 'UDF→C Function' for performing 'BITWISE AND' between lossy query code 136 and lossy searchable code 132 corresponding to each track in the table. All rows that intersect region of interest 140 are returned as part of the result set to identify the spatial location of the event.

The result set is then typically returned to the user as a display 148 (e.g., via a graphical user interface). To accomplish this, spatial representation tool 153 comprises a display component 170 (FIG. 2) configured to decompress contour-coded blob 134 corresponding to lossy query code 136 based on the comparison of lossy query code 136 to lossy searchable code 132 of trajectory data 117 of the event within video image data 119. Contour-coded blob 134 is converted back to the original version of trajectory data 117 and displayed on display 148. Display component 170 plots a trajectory (147, 149) of the event within video image data 119 to identify the spatial location of the event.

Figure 4:
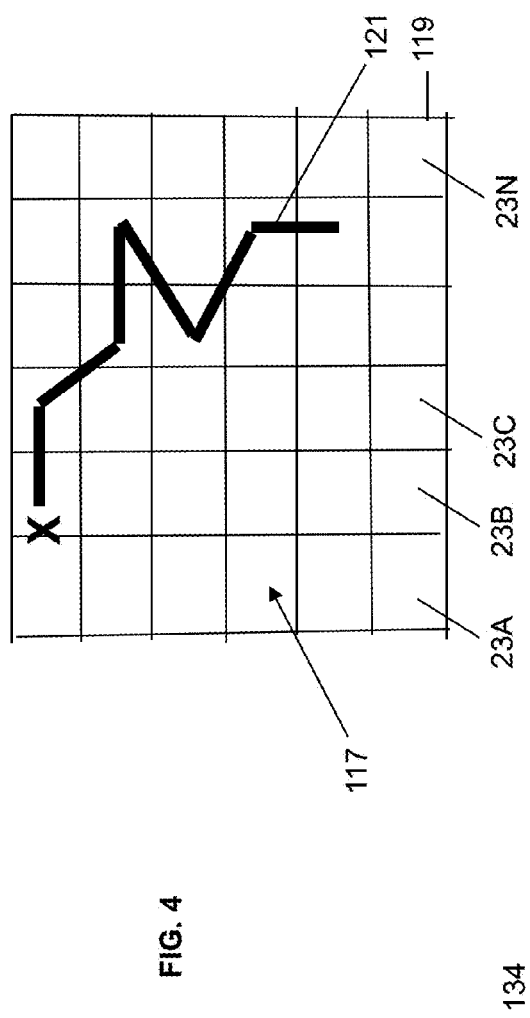
FIG. 4 shows an approach for lossless contour coding generation according to embodiments of the invention.

Referring now to FIGS. 3-6, a coding scheme for identifying a spatial location of an event within video image data 119 will be described in further detail. As mentioned above, compression component 155 (FIG. 2) is configured to generate a lossy searchable code 132 of trajectory data 117 of the event within video image data 119, and a lossless compressed contour-coded blob 134 of trajectory data 117 of the event within video image data 119. As shown in FIG. 4, in the first case, compression component 150 is configured to receive trajectory data 117 of event "X" (e.g., a person, a security breach, a criminal act, suspicious activity, etc.) within video image data 119, and generate a contour-coded blob 134 from lossless contour code 131 (FIG. 3) to encode trajectory 121 of event "X". To accomplish this, compression component 155 is configured to divide video image data 119 into a plurality of pixel regions 23A, 23B, 23C, . . . 23N, determine whether each of plurality of pixel regions 23A-23N contains trajectory data 117. That is, each pixel is analyzed to determine if trajectory 121 intersects the pixel. If yes, a '1' is entered into 36 bit contour-coded blob 134. If trajectory 121 does not intersect the pixel, '0' is entered. This process is repeated until contour-coded blob 134 is complete and is entered into relational database 118.

Figure 5:
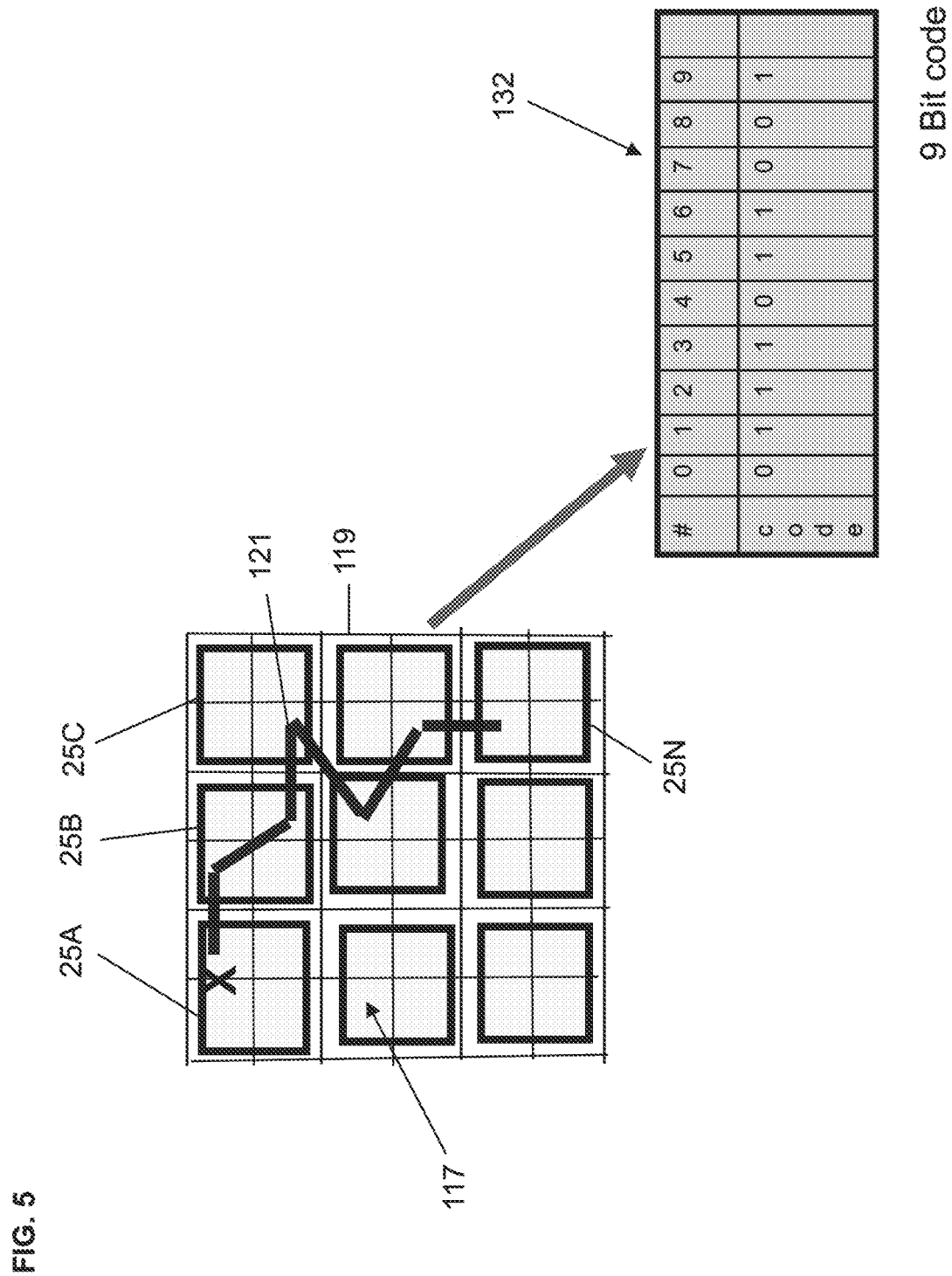
FIG. 5 shows an approach for lossy search code generation according to embodiments of the invention.

Next, as shown in FIG. 5, a lossy searchable code 132 of trajectory data 117 of the event within video image data 119 is generated. To accomplish this, compression component 155 is configured to divide video image data 119 into a second plurality of pixel regions 25A, 25B, 25C, . . . 25N. As shown, second plurality of pixel regions 25A-25N comprises less pixel regions than plurality of pixel regions 23A-23N for contour coded blob 134. In this case, the 6×6 representation of video image data 119 is quantized into a 3×3 image, thus generating 9 bit lossy searchable code 132. Once again, to encode trajectory data 117, it is determined whether each of second plurality of pixel regions 25A-25N contains trajectory data 117. That is, each pixel is analyzed to determine if trajectory 121 intersects the pixel. If trajectory 121 intersects, a '1' is entered to form 9 bit lossy searchable code 132. If trajectory 121 does not intersect the pixel, a '0' is entered. This process is repeated until lossy searchable code 132 is formed, and lossy searchable code 132 is then entered into relational database 118 to enable subsequent searching based on trajectory data 117 of event "X" within video image data 119.

Figure 6:
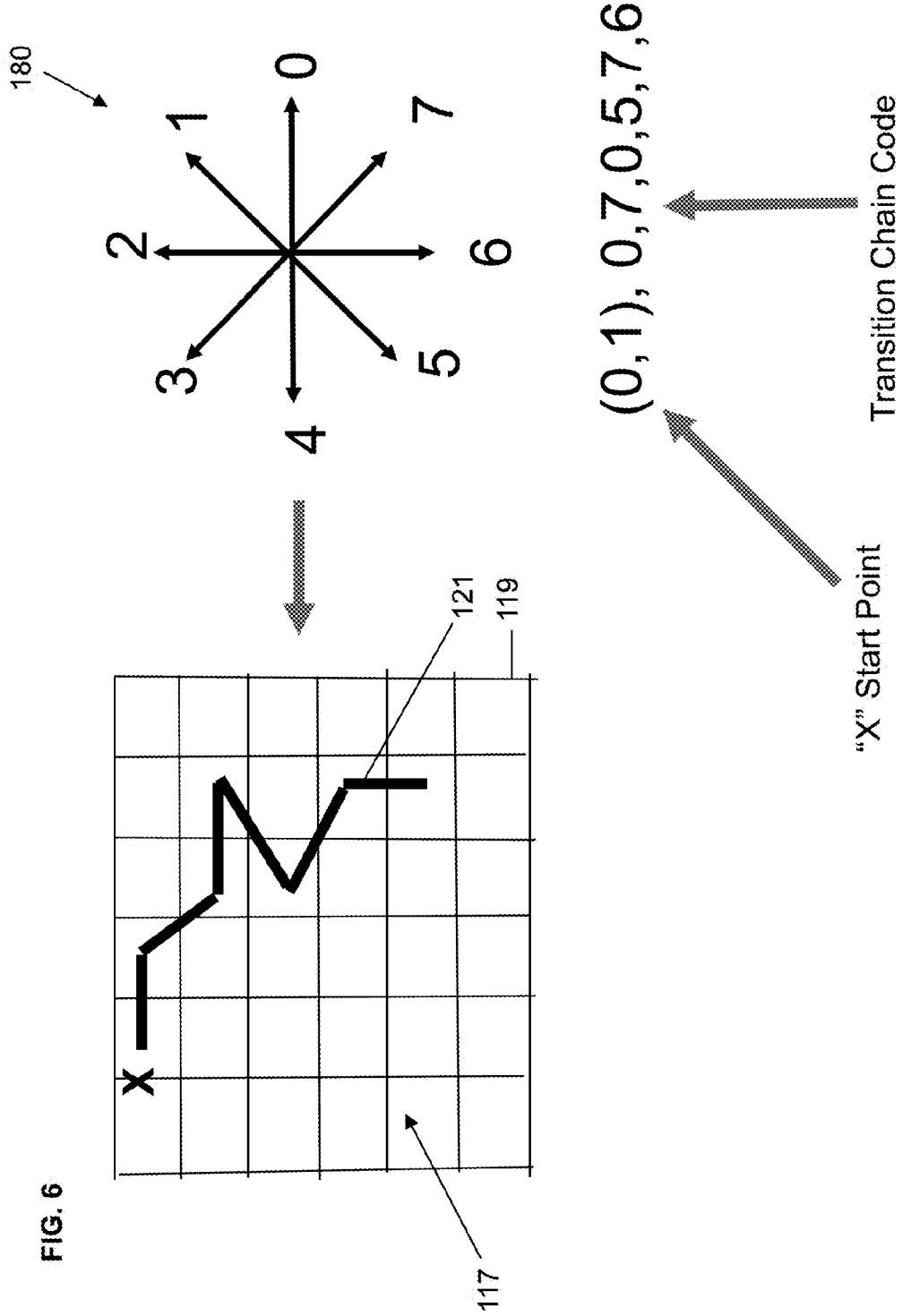
FIG. 6 shows an approach for identifying an event within the video image data according to embodiments of the invention.

Next, as shown in FIG. 6, trajectory data 117 of trajectory 121 is more precisely analyzed. In this embodiment, video image data 119 is analyzed using an 8-point neighborhood scan 180 to generate the transition chain code. As shown, event "X" starts at point (0,1), and the direction of trajectory 121 is plotted according to 8-point neighborhood scan 180. This embodiment allows increased specificity over the 6×6 image shown in FIG. 4. Rather than simply identifying whether trajectory 121 is present within each pixel, 8-point neighborhood scan provides information on a direction of trajectory 121 within each pixel. It will be appreciated that the precision may be adjusted by increasing or decreasing the number of points in the neighborhood scan.

It can be appreciated that the methodologies disclosed herein can be used within a computer system to identify a spatial location of an event within video image data, as shown in FIG. 1. In this case, spatial representation tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 7:
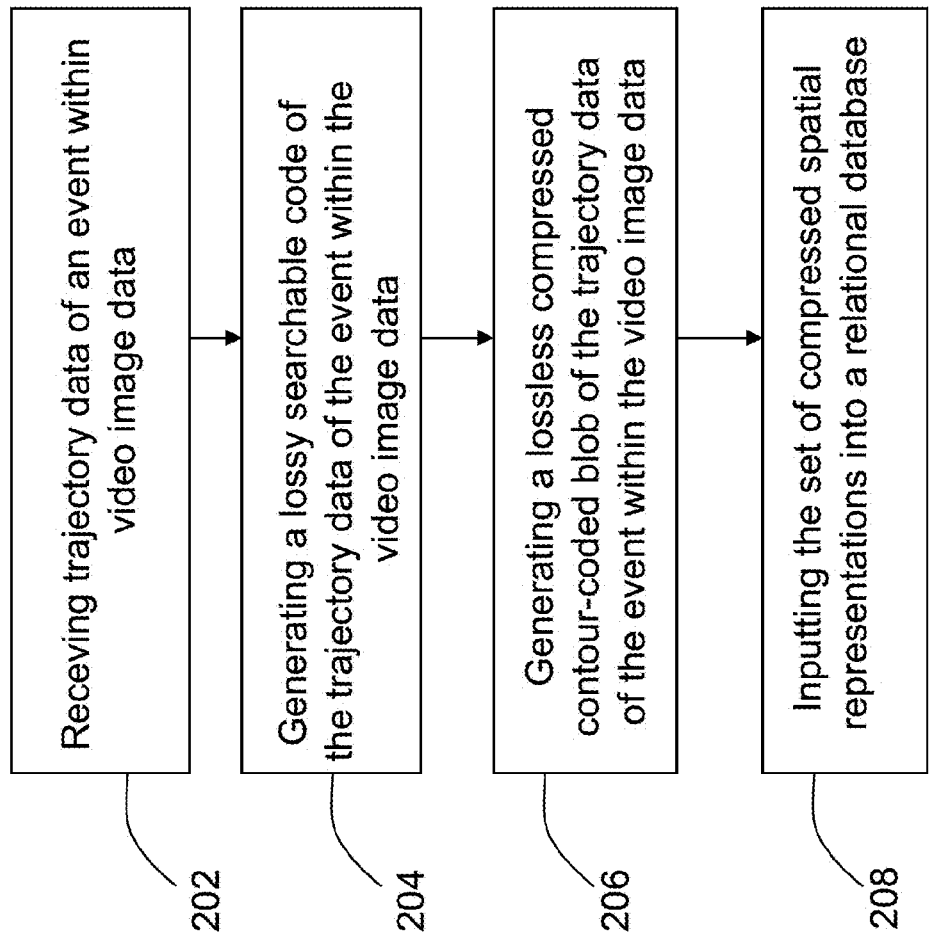
FIG. 7 shows a flow diagram of a method for searching within the video image data according to embodiments of the invention.

The program modules carry out the methodologies disclosed herein, as shown in FIG. 7. According to one embodiment for generating a coding scheme, at 202, trajectory data of an event within video image data is received. At 204, a lossy searchable code of the trajectory data of the event within the video image is generated. At 204B, a lossless compressed contour-coded blob of the trajectory data of the event within the video image data is generated. At 206, lossless compressed contour-coded blob and the lossy searchable code are entered into the relational database.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for identifying a spatial location of an event within video image data. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for generating a coding scheme for identifying a spatial location of an event within video image data comprising:
   receiving trajectory data of a trajectory of an object for an event within video image data;
   generating a lossless compressed contour-coded blob to encode the trajectory data of the trajectory of an object for the event within the video image data;
   generating a lossy searchable code, which corresponds to the lossless compressed contour-coded blob and is not in the video image data, of the trajectory data of the trajectory of the object for the event within the region of interest;
   converting a region of interest within the video image data to a lossy query code, the region of interest corresponding to a sub-section of a visual display output of the video image data; and
   comparing the lossy query code to the lossy searchable code within a relational database to identify a corresponding lossless trajectory data of the trajectory of the object for the event within the video image data.

2. The method according to claim 1, the generating the lossless compressed contour-coded blob comprising:
   dividing the video image data into a plurality of pixel regions; and
   determining whether each of the plurality of pixel regions contains trajectory data of the trajectory of the object for the event within the video image data.

3. The method according to claim 2, the generating the lossy searchable code comprising:
   dividing the video image data into a second plurality of pixel regions, the second plurality of pixel regions comprising less pixel regions than the plurality of pixel regions for the lossless compressed contour-coded blob; and
   determining whether each of the second plurality of pixel regions contains trajectory data of the trajectory of the object for the event within the video image data.

4. The method according to claim 1, further comprising inputting the lossless compressed contour-coded blob, the lossy searchable code, and a trajectory identifier into the relational database.

5. The method according to claim 1, further comprising searching the relational database based on the trajectory data of the trajectory of the object for the event within the video image data.

6. The method according to claim 1, further comprising specifying, via a user input, the region of interest corresponding to the sub-section of the visual display output of the video image data.

7. A system for generating a coding scheme for identifying a spatial location of an event within video image data comprising:
   at least one processing unit;
   memory operably associated with the at least one processing unit; and
      a spatial representation tool storable in memory and executable by the at least one processing unit, the spatial representation tool comprising a compression component configured to:
   receive trajectory data of a trajectory of an object for an event within video image data;
   generate a lossless compressed contour-coded blob to encode the trajectory data of the trajectory of the object for the event within video image data;
   generate a lossy searchable code, which corresponds to the lossless compressed contour-coded blob and is not in the video image data, of the trajectory of the object for the event within the video image data;
   convert a region of interest within the video image data to a lossy query code, the region of interest corresponding to a sub-section of a visual display output of the video image data; and
   compare the lossy query code to the lossy searchable code within a relational database to identify a corresponding lossless trajectory data of the trajectory of the object for the event within the video image data.

8. The spatial representation tool according to claim 7, the compression component further configured to:
   divide the video image data into a plurality of pixel regions; and
   determine whether each of the plurality of pixel regions contains trajectory data of the trajectory of the object for the event within the video image data.

9. The spatial representation tool according to claim 8, the compression component further configured to:
   divide the video image data into a second plurality of pixel regions, the second plurality of pixel regions comprising less pixel regions than the plurality of pixel regions for the lossless compressed contour-coded blob; and
   determine whether each of the second plurality of pixel regions contains trajectory data of the trajectory of the object for the event within the video image data.

10. The spatial representation tool according to claim 7, further comprising an input component configured to input the lossless compressed contour-coded blob, the lossy searchable code, and a trajectory identifier into the relational database.

11. The spatial representation tool according to claim 7, the compression component further configured to search the relational database based on the trajectory data of the trajectory of the object for the event within the video image data.

12. The spatial representation tool according to claim 7, the compression component further configured to specify, via a user input, the region of interest corresponding to the sub-section of the visual display output of the video image data.

13. A computer-readable storage-device that is not a signal and stores computer instructions, which when executed, enables a computer system to generate a coding scheme for identifying a spatial location of an event within video image data, the computer instructions comprising:
receiving trajectory data of a trajectory of an object for an event within video image data;
generating a lossless compressed contour-coded blob to encode the trajectory data of the trajectory of an object for the event within the video image data;
generating a lossy searchable code, which corresponds to the lossless compressed contour-coded blob and is not in the video image data, of the trajectory data of the trajectory of the object for the event within the region of interest;
converting a region of interest within the video image data to a lossy query code, the region of interest corresponding to a sub-section of a visual display output of the video image data; and
comparing the lossy query code to the lossy searchable code within a relational database to identify a corresponding lossless trajectory data of the trajectory of the object for the event within the video image data.

14. The computer-readable storage-device according to claim 13, the computer instructions for generating the lossless compressed contour-coded blob further comprising:
dividing the video image data into a plurality of pixel regions; and
determining whether each of the plurality of pixel regions contains trajectory data of the trajectory of the object for the event within the video image data.

15. The computer-readable storage-device according to claim 14, the computer instructions for generating the lossy searchable code further comprising:
dividing the video image data into a second plurality of pixel regions, the second plurality of pixel regions comprising less pixel regions than the plurality of pixel regions for the lossless compressed contour-coded blob; and
determining whether each of the second plurality of pixel regions contains trajectory data of the trajectory of the object for the event within the video image data.

16. The computer-readable storage-device according to claim 13 further comprising computer instructions for inputting the lossless compressed contour-coded blob, the lossy searchable code, and a trajectory identifier into the relational database.

17. The computer-readable storage-device according to claim 13 further comprising computer instructions for searching the relational database based on the trajectory data of the trajectory of the object for the event within the video image data.

18. The computer-readable storage-device according to claim 13 further comprising computer instructions for specifying, via a user input, the region of interest corresponding to the sub-section of the visual display output of the video image data.

\* \* \* \* \*